(12) United States Patent
Kondo (10) Patent No.: US 11,831,096 B2
(45) Date of Patent: Nov. 28, 2023

(54) ELECTRICAL CONNECTOR INCLUDING TERMINALS WITH GROOVES

(71) Applicant: Yazaki Corporation, Tokyo (JP)

(72) Inventor: Fuminori Kondo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 156 days.

(21) Appl. No.: 17/680,973

(22) Filed: Feb. 25, 2022

(65) Prior Publication Data

US 2022/0285862 A1 Sep. 8, 2022

(30) Foreign Application Priority Data

Mar. 2, 2021 (JP) .................................. 2021-032540

(51) Int. Cl.
| | | |
|---|---|---|
| *H01R 13/405* | (2006.01) | |
| *H01R 12/72* | (2011.01) | |
| *H01R 13/40* | (2006.01) | |
| *H01R 13/41* | (2006.01) | |
| *H01R 13/52* | (2006.01) | |

(52) U.S. Cl.
CPC ........... *H01R 12/724* (2013.01); *H01R 13/40* (2013.01); *H01R 13/405* (2013.01); *H01R 13/41* (2013.01); *H01R 13/521* (2013.01)

(58) Field of Classification Search
CPC ...... H01R 13/40; H01R 13/405; H01R 13/41; H01R 13/521; H01R 12/724
USPC ............................................. 439/733.1, 736
See application file for complete search history.

(56) References Cited

U.S. PATENT DOCUMENTS

| | | | | |
|---|---|---|---|---|
| 3,522,575 A | * | 8/1970 | Johnson ............. | H01R 13/5216 439/736 |
| 5,145,413 A | * | 9/1992 | Okamoto ........... | H01R 13/7195 333/182 |
| 5,433,628 A | * | 7/1995 | Sadaishi ............ | H01R 13/5202 439/736 |
| 6,067,004 A | * | 5/2000 | Hibayashi ........... | H01H 85/044 337/252 |
| 6,444,911 B2 | * | 9/2002 | Maruyama ............... | H02G 3/16 174/70 B |
| 6,958,674 B2 | * | 10/2005 | Tsuchida ................ | H01C 10/44 338/276 |

(Continued)

FOREIGN PATENT DOCUMENTS

| | | |
|---|---|---|
| JP | 2002-248589 A | 9/2002 |
| JP | 2012-101394 A | 5/2012 |

(Continued)

*Primary Examiner* — Marcus E Harcum
(74) *Attorney, Agent, or Firm* — Sughrue Mion, PLLC (57) ABSTRACT

The connector includes a terminal and a resin housing that houses and retains the terminal. One or a plurality of grooves extend in a part of a region of a surface of the terminal. An inclination surface is formed near an opening of the groove. The groove is formed to have a part with a minimum width parallel to the surface of the terminal and a part with a maximum width parallel to the surface of the terminal. An angle formed by the inclination surface with respect to the surface of the terminal is between 100 degrees and 150 degrees. Moreover, a ratio of the minimum width of the groove with respect to the maximum width of the groove is equal to or greater than 0.58 and less than 1.0. The terminal is embedded and fixed in the resin forming the housing.

3 Claims, 4 Drawing Sheets

(56) References Cited

U.S. PATENT DOCUMENTS

| | | | | |
|---|---|---|---|---|
| 7,413,445 | B2* | 8/2008 | Inagaki | B60R 16/0239 |
| | | | | 439/936 |
| 7,448,887 | B2* | 11/2008 | Ikeya | H01R 13/639 |
| | | | | 439/157 |
| 8,167,629 | B2* | 5/2012 | Ito | H01R 12/724 |
| | | | | 439/736 |
| 8,657,609 | B2* | 2/2014 | Yanagisawa | H05K 5/0056 |
| | | | | 439/79 |
| 9,608,359 | B2* | 3/2017 | Arai | H01R 13/5202 |
| 10,804,643 | B2* | 10/2020 | Tada | H01R 13/41 |
| 11,381,024 | B2* | 7/2022 | Xu | H01R 43/20 |
| 11,411,343 | B2* | 8/2022 | Asano | H05K 3/284 |
| 2003/0214382 | A1* | 11/2003 | Tsuchida | H01C 10/44 |
| | | | | 338/162 |
| 2004/0192117 | A1* | 9/2004 | Mott | B29C 45/14549 |
| | | | | 439/736 |
| 2006/0063412 | A1* | 3/2006 | Matsumoto | H01R 13/5205 |
| | | | | 439/274 |
| 2008/0188108 | A1* | 8/2008 | Behr | H01R 43/16 |
| | | | | 439/271 |
| 2013/0217278 | A1* | 8/2013 | Shiraishi | H01R 12/727 |
| | | | | 439/733.1 |
| 2014/0287631 | A1* | 9/2014 | Tashiro | H01R 43/20 |
| | | | | 439/733.1 |
| 2016/0036155 | A1 | 2/2016 | Kataoka et al. | |
| 2018/0131123 | A1 | 5/2018 | Kondo | |
| 2019/0027859 | A1* | 1/2019 | Tada | H01R 43/24 |
| 2020/0136303 | A1* | 4/2020 | Ito | H01R 13/521 |

FOREIGN PATENT DOCUMENTS

| | | |
|---|---|---|
| JP | 2016-203643 A | 12/2016 |
| JP | 2017-175068 A | 9/2017 |
| JP | 2018-78022 A | 5/2018 |

* cited by examiner

ELECTRICAL CONNECTOR INCLUDING TERMINALS WITH GROOVES

CROSS REFERENCE TO RELATED APPLICATION

The present application is based on, and claims priority from the prior Japanese Patent Application No. 2021-032540, filed on Mar. 2, 2021, the entire contents of which are incorporated herein by reference.

TECHNICAL FIELD

The present disclosure relates to a connector.

BACKGROUND

A connector is used in a wire harness of electronic equipment, an on-board and electrical component, a transmission, or the like. In general, a connector of this type is produced by molding a metal terminal and a resin housing integrally with each other through insert-molding. Further, for the purpose of water-proofing and oil-proofing, bondability between metal and resin and airtightness of the connector need to be secured.

Thus, there has been known a technique in which irregularities are formed on a surface of the metal terminal to improve bondability between the terminal and the housing. JP 2017-175068 A describes that part of resin enters pores in a surface of a metal member and that bondability between metal and resin is improved due to an anchoring effect and an effect obtained by increasing a contact area. Further, as examples of a method of forming pores, etching through use of chemicals, laser light irradiation, and the like are given.

SUMMARY

The related art has problems relating to bondability between metal and resin. For example, after the terminal and the housing are molded integrally with each other, a fine gap is formed at an interface between the terminal and the housing, or a crack is formed in the housing due to a curing process of the resin or a change in environment temperature generates. Further, the surface of the terminal is subjected to processing to have grooves by repeating laser irradiation for a plurality of times and melting the terminal (metal). Thus, a metal residue (hereinafter, referred to as "debris") is generated in a periphery of an opening of a groove. When debris is generated, there is a difficulty in controlling a surface shape of the terminal member. After the terminal and the housing are molded integrally with each other, a contact part with debris acts as a stress concentration part, which may cause formation of a crack in the housing.

The present disclosure has been achieved in view of the above-mentioned problem in such a related-art. Further, the present disclosure has an object to provide a connector with excellent bondability and excellent airtightness between a terminal and a housing, and also with improved durability against a sudden temperature change.

A connector according to one aspect of the present disclosure includes a terminal and a resin housing that houses and retains the terminal. One or a plurality of grooves extend in a direction vertical to a longitudinal direction of the terminal, and are arranged and formed in a part of a region of a surface of the terminal. An inclination surface is formed near an opening of the groove. The inclination surface is inclined with respect to the surface of the terminal. The groove is formed to have a part with a minimum width parallel to the surface of the terminal and a part with a maximum width parallel to the surface of the terminal in the stated order from the opening in a depth direction vertical to the surface of the terminal. An angle formed by the inclination surface near the opening of the groove with respect to the surface of the terminal is between 100 degrees and 150 degrees. Moreover, a ratio of the minimum width of the groove with respect to the maximum width of the groove is equal to or greater than 0.58 and less than 1.0. The terminal is embedded and fixed in the resin forming the housing in the part including the region where the grooves are extended.

According to the present disclosure, there can be provided the connector with excellent bondability and excellent airtightness between the terminal and the housing, and also with improved durability against a sudden temperature change.

DETAILED DESCRIPTION

<Connector>

With reference to the drawings, a connector according to the present embodiment is described below. Note that dimensional ratios in the drawings are overdrawn for convenience of description, and may be different from actual dimensional ratios in some cases.

Figure 1:
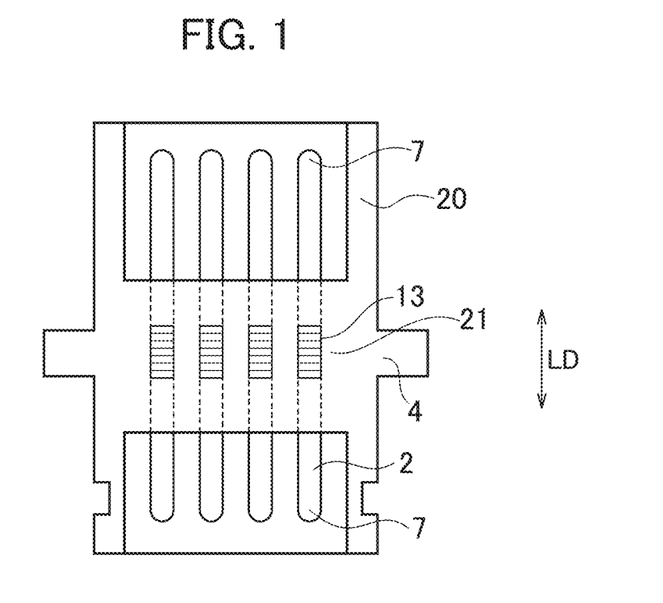
FIG. 1 is a schematic plan view illustrating a connector according to the present embodiment.

FIG. 1 illustrates a male-to-male connector in which a terminal 2 is housed and retained in a resin housing 4. The terminal 2 includes an electrical connection portion 7 to be connected to a mating terminal (not shown).

In FIG. 1, a plurality of grooves 13 extend in a middle part of the terminal 2 in a longitudinal direction. The grooves 13 are arranged and formed in an entire outer surface of the terminal 2 in a circumferential direction being a direction vertical to the longitudinal direction of the terminal 2. The grooves 13 are described below in detail.

The housing 4 is a resin molded component with insulating properties. A connector engagement portion 20, inside of which is disposed the electrical connection portion 7 of the terminal 2, and an insert portion 21, inside of which are insert-molded the terminal 2, are formed integrally with the housing 4.

Figure 2:
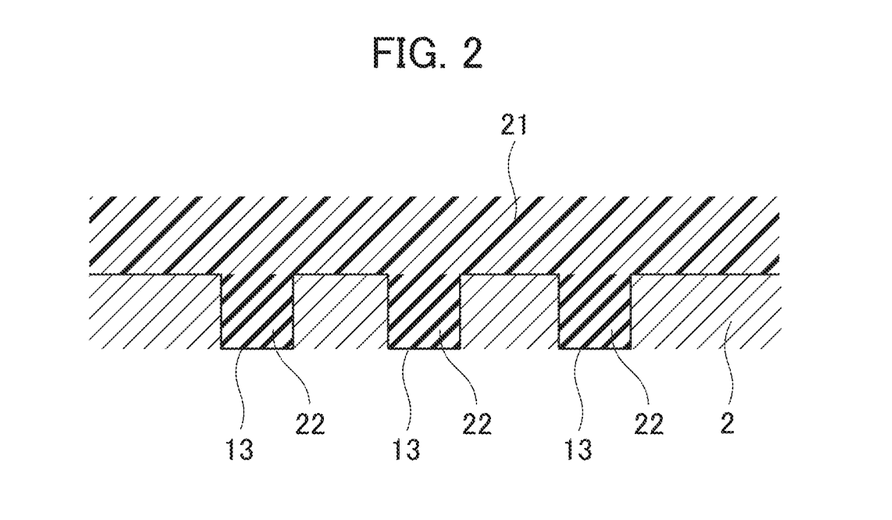
FIG. 2 is a cross-sectional view illustrating a state in which a resin is solidified in grooves extending in a terminal.

As described above, the plurality of grooves 13 extend in the entire outer surface of the terminal 2 in the circumferential direction being a direction vertical to the longitudinal direction of the terminal 2. Further, the terminal 2 is covered with the insertion portion 21. As illustrated in FIG. 2, the terminal 2 is embedded and fixed in the resin forming the housing 4 in the region where the grooves 13 are extended. The resin material enters the grooves 13 and is solidified at the time of insert-molding. Thus, a state in which a plurality of terminal fixing portions 22 are formed is obtained.

Specifically, a contact area between the metal and the resin is increased due to presence of the grooves 13. Thus, bonding strength between the metal and the resin is improved. Further, an air and a liquid entering the connector are blocked by the terminal fixing portions 22. Thus, airtightness of the connector can be secured. Therefore, airtightness can be secured without requiring an additional component that is used in a related art, such as an acrylic rubber O-ring and a holder.

FIG. 1 and FIG. 2 illustrate a mode in which the grooves 13 extend in the direction vertical to the longitudinal direction of the terminal 2. However, in the present embodiment, the grooves 13 may extend in any direction including a directional component vertical to the longitudinal direction. For example, the grooves 13 may be formed so as to extend in an inclined direction with respect to the direction vertical to the longitudinal direction of the terminal 2. Further, the groove itself is not required to have a linear shape. For example, the groove may have a curved shape as long as the groove has a scale-like shape or a wave-like shape and overlaps with adjacent grooves. With this, the individual groove is capable of blocking entry of water.

Figure 3:
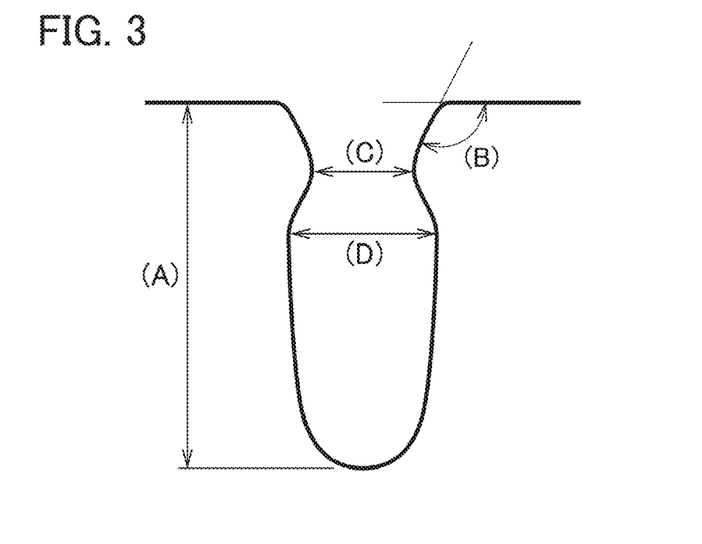
FIG. 3 is a cross-sectional view schematically illustrating a groove extending in the terminal.
Figure 4A:
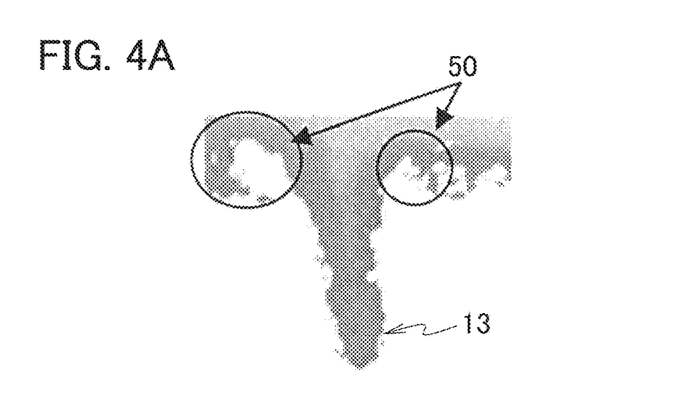
FIG. 4A is an electron microscope photograph illustrating a cross-section of the groove extending in the terminal before a debris removal step in an enlarged manner.
Figure 4B:
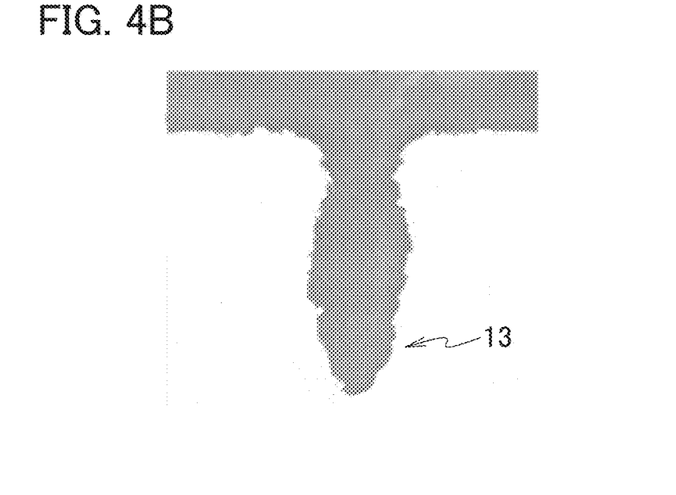
FIG. 4B is an electron microscope photograph illustrating the cross-section of the groove extending in the terminal after the debris removal step in an enlarged manner.

As illustrated in FIG. 3, an inclination surface is formed near an opening of the groove 13. The inclination surface is inclined with respect to the surface of the terminal 2. Further, an angle (B) formed by the inclination surface near the opening of the groove 13 with respect to the surface of the terminal 2 (hereinafter, referred to as an "angle (B)") is preferably between 100 degrees and 150 degrees. When the angle (B) is set between 100 degrees and 150 degrees, bonding strength between the metal and the resin can further be improved due to an anchoring effect. Note that, in a case of laser processing, an output and a scanning speed are adjusted as laser irradiation conditions. With this, the angle (B) can be set between 100 degrees and 150 degrees. Further, as illustrated in FIG. 4B, the cross section of the groove 13 is observed with a scanning electron microscope (SEM). A tangential line may be drawn with respect to the inclination surface described above, and the angle (B) may be regarded as an angle formed between the tangential line and an extension line of the surface of the terminal 2.

Further, as illustrated in FIG. 3, the groove 13 is formed to have a part with a minimum width (C) parallel to the surface of the terminal 2 and a part with a maximum width (D) parallel to the surface of the terminal 2 in the stated order from the opening in a depth direction vertical to the surface of the terminal 2. The groove 13 has the part with the minimum width (C) and the part with the maximum width (D). With this, the resin entering the groove 13 is engaged with the part with the minimum width (C). Thus, airtightness between the terminal 2 and the housing 4 can further be improved. Further, in order to enhance an anchoring effect of the housing 4 with respect to the terminal 2, a ratio (C/D) of the minimum width (C) with respect to the maximum width (D) is equal to or greater than 0.58 and less than 1.0, preferably, equal to or greater than 0.6 and less than 0.9, particularly preferably, equal to or greater than 0.6 and less than 0.75. Note that, in a case of laser processing, an output and a scanning speed are adjusted as laser irradiation conditions. With this, the ratio (CID) can be set to equal to or greater than 0.58 and less than 1.0. Specifically, the ratio (C/D) can be increased by increasing the output, and the ratio (C/D) can be increased by increasing the scanning speed. Further, as illustrated in FIG. 4B, the minimum width (C) of the groove and the maximum width (D) of the groove can be measured by observing the cross section of the groove 13 with a scanning electron microscope (SEM).

As illustrated in FIG. 3, in order to further enhance an anchoring effect, a groove depth (A) in the direction vertical to the surface of the terminal 2 is preferably between 60 μm and 80 μm. Note that, in a case of laser processing, an output and a scanning speed are adjusted as laser irradiation conditions. With this, the groove depth (A) can be set between 60 μm and 80 μm. Further, as illustrated in FIG. 4B, the groove depth (A) can be measured by observing the cross section of the groove 13 with a scanning electron microscope (SEM).

The one or plurality of grooves 13 extending in the terminal 2 are formed. From a viewpoint of improvement in airtightness and bonding strength, the number of grooves is preferably five or more.

Examples of a material used for forming the housing 4 include various types of thermoplastic resins such as polyethylene (PE), polypropylene (PP), polystyrene (PS), polybutylene terephthalate (PBT), polyamide 66 (PA66), aromatic polyamide (PA6T), polyphenylene sulfide (PPS), syndiotactic polystyrene (SPS), and acrylonitrile styrene resin (AS). Particularly, among those examples, SPS is preferably used. This is because SPS has excellent heat resistance, oil resistance, and chemical resistance, and lasts for a long time period for use in an oil cooling structure. As described above, due to its high oil resistance, SPS has inferior adhesiveness when an adhesive agent is used to achieve chemical adhesion. However, in the present embodiment, a problem relating to adhesiveness can be solved by forming the grooves in the terminal, and hence advantages of SPS can be effectively utilized.

Both the material forming the housing 4 and the material forming the terminal 2 have linear expansion coefficients that are changed due to cooling and heating along with a temperature change. Thus, the material forming the housing 4 having a linear expansion coefficient similar to that of the material forming the terminal 2 is preferably selected and used.

Examples of the material forming the terminal 2 include a conductive material such as copper or a copper alloy, aluminum or an aluminum alloy, and SUS. From a viewpoint of conductivity and processability, oxygen-free copper (C1020 ½H) is preferred. Note that presence or absence of metal plating is not particularly specified.

As described above, the connector according to the present embodiment includes the terminal 2 and the resin housing 4 that houses and retains the terminal 2. The one or plurality of grooves 13 extend in a part of a region of the surface of the terminal 2, and are arranged and formed in the direction vertical to the longitudinal direction of the terminal 2. Further, the inclination surface is formed near the opening of the groove 13. The inclination surface is inclined with respect to the surface of the terminal 2. The groove 13 is formed to have the part with the minimum width parallel to the surface of the terminal 2 and the part with the maximum width parallel to the surface of the terminal 2 in the stated order from the opening in the depth direction vertical to the surface of the terminal 2. The angle formed by the inclination surface near the opening of the groove 13 with respect to the surface of the terminal 2 is between 100 degrees and 150 degrees. Moreover, the ratio of the minimum width of the groove 13 with respect to the maximum width of the groove 13 is equal to or greater than 0.58 and less than 1.0. The terminal 2 is embedded and fixed in the resin forming the housing 4 in the part including the region where the grooves 13 are extended. With this, there can be provided the connector with excellent bondability between the terminal 2 and the housing 4 and excellent airtightness, and also with improved durability against a sudden temperature change.

Further, in the connector according to the present embodiment, airtightness between the housing and the terminal can be improved. Airtightness between the housing and the terminal, measured under a condition A described below, may be equal to or greater than 50 kPa, and may be equal to or greater than 100 kPa, equal to or greater than 200 kPa, or equal to or greater than 300 kPa when a condition is satisfied.

(condition A) compressed air is blown between the housing and the terminal from one side of the connector, a pressure of the compressed air is increased from 10.0 kPa to 400.0 kPa in constant intervals every 60 seconds, and a pressure of the compressed air when air leakage is detected at the other side of the connector is deemed to be airtightness pressure.

Note that, as described above, in the connector according to the present embodiment, bonding strength between the housing and the terminal can be improved. Further, for example, peel strength between the housing and the terminal, which is measured according to ISO 19095 series, can be equal to or greater than 1.8 N/12.7 mm.

In the connector according to the present embodiment, bondability between the housing and the terminal is improved. With this, even when a sudden temperature change is intentionally caused during a thermal shock test, degradation of airtightness can be suppressed, and durability can be improved.

The connector according to the present embodiment has excellent bondability and excellent airtightness between the terminal and the housing, as described above. Further, the connector is significantly suitable for use in as an airtight structure in a wire harness of electronic equipment, an on-board and electrical component, a transmission, a device, a relay, a sensor, or the like, and reliability of the connector can be improved. Moreover, application is not limited to an underfloor harness of a vehicle such as an automobile and a harness of an air-conditioning apparatus, and application to a motor harness having an oil cooling structure can be achieved.

Further, in the connector according to the present embodiment, the number of components can be reduced. Thus, size reduction and weight reduction can be achieved. Specifically, a component that is used in a related art, such as an acrylic rubber O-ring and a holder can be omitted. Along with this omission, the connector as a whole can be reduced in size.

<Method of Manufacturing Connector>

Next, a method of manufacturing a connector according to the present embodiment is described. The method of manufacturing a connector includes a step of forming the one or plurality of grooves 13 in the part of the region of the surface of the terminal 2 through laser irradiation, the groove extending in the longitudinal direction of the terminal 2 (hereinafter, also referred to as a "groove formation step"). Further, the method includes a step of removing debris 50 from the surface of the terminal 2 through laser irradiation, the debris being generated at the time of forming the groove 13 (hereinafter, also referred to as a "debris removal step").

First, in the groove formation step, the one or plurality of grooves 13 are formed in the part of the region of the surface of the terminal 2 so as to extend in the direction vertical to the longitudinal direction of the terminal 2. The groove 13 extending in the terminal 2 may be formed through cutting, laser machining, or pressing. Among those, in order to secure sufficient airtightness, laser machining for forming the groove 13 through laser irradiation is preferred. Such a laser machining technique is described in JP 2010-167475 A. Further, when the groove 13 is formed in the terminal 2 through laser irradiation, the required number of grooves 13 can be formed in a required range, and the grooves 13 can be formed in an uniform shape. Thus, high bonding strength with the housing 4 can be maintained for a long time period.

Subsequently, in the debris removal step, the debris 50 generated during formation of the groove 13 is removed from the surface of the terminal 2 through laser irradiation. In the previous step, the groove 13 is formed by repeating laser irradiation for a plurality of times and melting the terminal (metal). Thus, as illustrated in FIG. 4A, the debris 50 is generated in the periphery of the opening of the groove 13. Due to generation of the debris 50, there is a difficulty in controlling the surface shape of the terminal 2. Further, the debris 50 has a sharp part. Thus, after the terminal 2 and the housing 4 are molded integrally with each other, a contact part between the debris 50 and the housing 4 acts as a stress concentration part, which causes formation of a crack in the housing.

Thus, the debris 50 is melted through laser irradiation, and the debris 50 is removed from the surface of the terminal 2. With this, stress concentration between the metal and the resin, which is caused in the periphery of the opening of the groove 13, can be alleviated. As illustrated in FIG. 4B, the melted debris 50 is accumulated near the opening of the groove 13 again in a lid-like shape. As a result, the angle (B), the ratio (C/D) of the minimum width (C) of the groove with respect to the maximum width (D) of the groove, and the groove depth (A) can be controlled to fall within the above-mentioned ranges. With this, the groove with a shape enhancing an anchoring effect can be formed. Further, in a subsequent resin molding step, bonding strength between the metal and the resin can be improved. Note that the debris removal step is performed after the groove formation step. However, the groove formation step may be performed several times. The debris removal step may be performed between the groove formation steps.

Subsequently, in the resin molding step, the housing 4 is obtained through resin molding (secondary molding). At the time of molding for the housing 4, the terminal 2 undergoes insert molding. The resin material enters the grooves 13 and is solidified through insert-molding, and thus a large number of terminal fixing portions 22 are formed. The terminal 2 is fixed along with resin molding of the housing 4.

As described above with reference to FIG. 1 to FIG. 4B, in the connector according to the present embodiment, the terminal 2 is fixed to the housing 4 without using a dedicated fixing member. This is because one or plurality of grooves 13 are formed in the terminal 2, and the existence of the grooves 13 increases the contact area between the housing 4 and the terminal 2, resulting in improved bonding strength. Further, the terminal fixing portions 22 blocks entry of an air and a liquid from the outside, and hence airtightness is improved.

EXAMPLES

The present embodiment is further described below in detail with Examples and Comparative Examples. However, the present embodiment is not limited to those examples.

Examples 1 to 8

First, a metal piece (127 mm×12.7 mm, thickness: 0.5 mm, linear expansion coefficient: $17.7\times10^{-6}/°$ C.) formed of oxygen-free copper (C1020 ½H) was subjected to laser machining to form the grooves (see FIG. 5A). Specifically, in each of the examples, a fiber laser machining machine (ML-7350DL available from AMADA WELD TECH CO., LTD.) was used to perform laser irradiation in a direction perpendicular to a longitudinal direction of the metal piece, and thus the grooves were formed for each sample. Further, the same equipment was used to perform laser irradiation, and thus debris generated in the periphery of the opening of the groove was removed. Note that whether debris was removed was confirmed by observing the cross-section of the groove with a scanning electron microscope (SEM). When a debris height on the surface of the terminal was 5 μm or less, removal of debris was confirmed.

Laser irradiation conditions in the groove formation step were set as an output of 16 W, a scanning speed of 600 mm/s, and the repeated times of laser scanning of six to eight. Further, laser irradiation conditions in the debris removal step were set as an output of 3 W, a scanning speed of 1,200 mm/s, and the repeated times of laser scanning of two. As a result, in each of the examples, the metal piece sample that had the groove depth (A), the angle (B), the minimum width (C) of the groove, the maximum width (D) of the groove, the ratio (CID) of the minimum width (C) of the groove with respect to the maximum width (D) of the groove, and the number of grooves without debris as shown in Table 1 was obtained (see FIG. 5A).

Figures 5A, 5B:
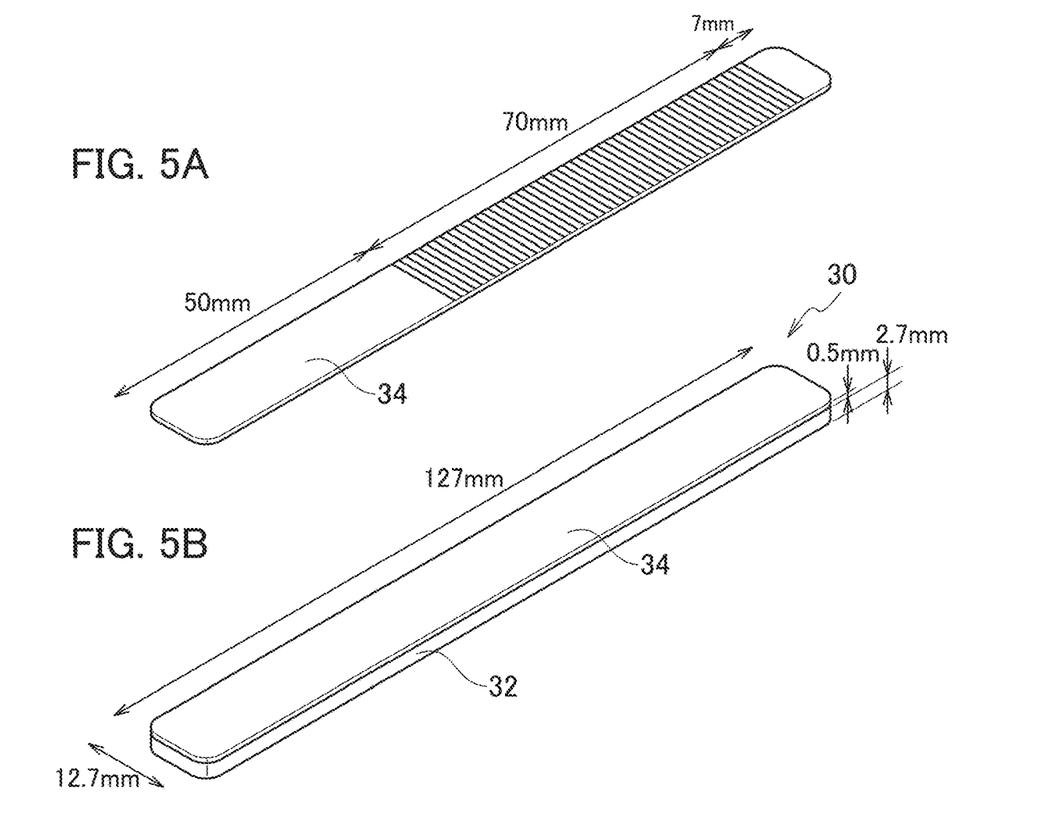
FIG. 5A is a perspective view schematically illustrating a metal piece.
FIG. 5B is a perspective view schematically illustrating a state following integral molding of the metal piece and a resin.

Subsequently, a resin (127 mm×12.7 mm, thickness: 2.7 mm) shown in Table 1 was insert-molded with respect to the metal piece with the grooves formed therein, and thus a molded component sample formed of the metal piece and the resin in an integral manner was obtained (see FIG. 5B). Note that, in FIG. 5A to FIG. 5C, the reference symbol 30 indicates a molded component, the reference symbol 32 indicates the resin, and the reference symbol 34 indicates the metal piece.

As resins, the following materials were prepared.
SPS (XAREC (registered trade mark) C142 available from Idemitsu Kosan Co., Ltd., linear expansion coefficient: $18.0\times10^{-6}/°$ C.)
PPS (TORELINA (registered trade mark) A575W20 available from Toray Industries, Inc., linear expansion coefficient: $19.0\times10^{-6}/°$ C.)
PA6T (Arlen (registered trade mark) A350 available from Mitsui Chemicals, Inc., linear expansion coefficient: $18.0\times10^{-6}/°$ C.)

After that, as described later, 1) peel strength and 2) airtightness between the metal piece and the resin were measured for the molded component sample.

Comparative Examples 1 to 4

Similarly to Examples 1 to 8, laser irradiation was performed in a direction perpendicular to a longitudinal direction of the metal piece, and thus the grooves were formed for each sample. Further, removal of debris was not performed for Comparative Examples 1 and 2, and removal of debris was performed for Comparative Examples 3 and 4 in a similar manner to Examples 1 to 8. As a result, in each of the comparative examples, the metal piece sample that had the groove depth (A), the angle (B), the minimum width (C) of the groove, the maximum width (D) of the groove, the ratio (C/D) of the minimum width (C) of the groove with respect to the maximum width (D) of the groove, and the number of grooves as shown in Table 2 was obtained. After that, similarly to Examples 1 to 8, SPS was insert-molded with respect to the metal piece with the grooves formed therein, and thus a molded component sample formed of the metal piece and the resin in an integral manner was obtained.

After that, similarly to Examples 1 to 8, 1) peel strength and 2) airtightness between the metal piece and the resin were measured for the molded component sample.

1) Peel Strength (Adhesive Force, Bondability)

Figure 5C:
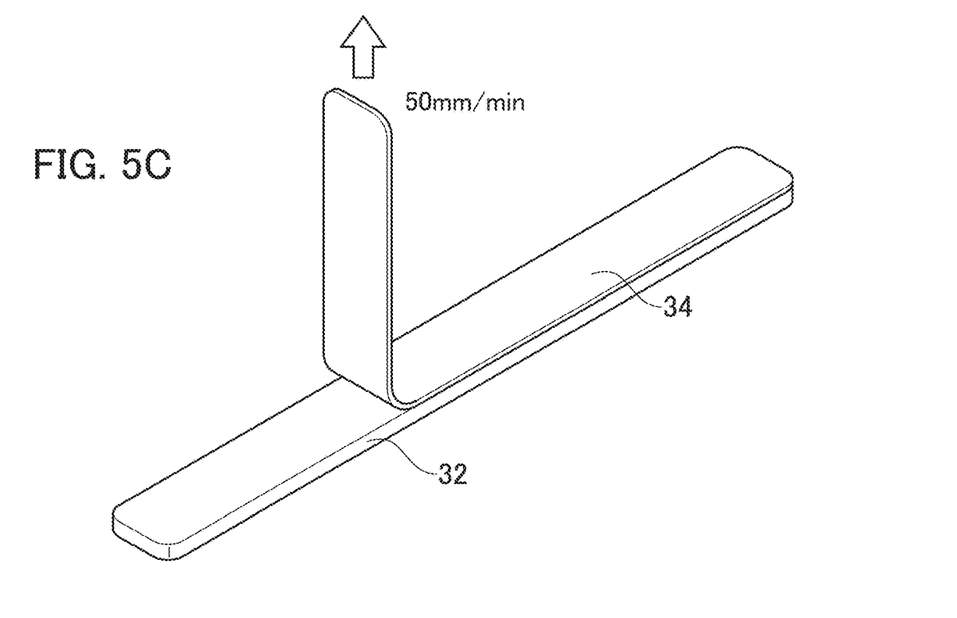
FIG. 5C is a perspective view schematically illustrating a state during a peel test, as one end of the metal piece is pulled upward.

For the molded component sample obtained in each of the examples and the comparative examples, a 90-degree peel testing device (Precision Universal Tester Autograph AG-1 available from SHIMADZU CORPORATION) was used to measure peel strength according to ISO 19095 series (see FIG. 5C). Specifically, the metal piece had a region of 70 mm that was subjected to laser machining and a region of 50 mm that was not subjected to laser machining (see FIG. 5A). Of those regions, the region of 50 mm that was not subjected to laser machining was pulled at a speed of 50 mm/min. In this manner, the peel test was conducted. An output force (N) was divided by the test piece width 12.7 mm. Numerical values thus obtained (unit: N/12.7 mm) are shown as measurement results in Table 1 and Table 2.

2) Airtightness (Sealing, Waterproof)

Figure 6:
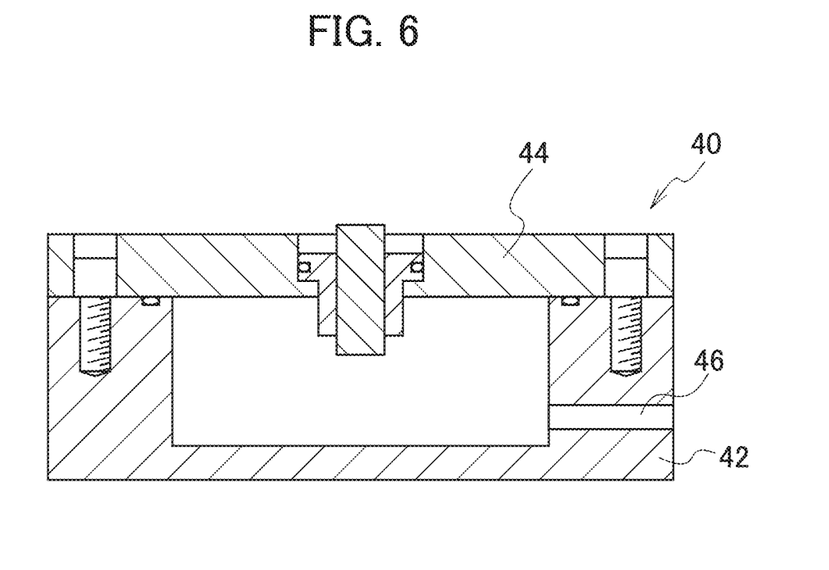
FIG. 6 is a cross-sectional view illustrating a jig that is used for evaluation airtightness.

With reference to FIG. 6, description is made on an aluminum jig that was used for measuring airtightness. A jig 40 illustrated in FIG. 6 included a jig main body 42 having a circular cylindrical shape with a closed bottom, and a lid portion 44 that seals an opening side of the jig main body 42. A vent 46 connected to the outside is provided in the jig main body 42, and compressed air is supplied to the internal space through this vent 46. A rectangular shaped opening into which the molded component undergoing airtightness measurement is inserted is provided within the central portion of the lid portion 44. This opening holds the molded component in a state where a portion of the molded component is exposed externally, and is watertight, so that when the molded component is held within the opening, water cannot enter the interior of the jig main body 42.

Airtightness of the molded component sample obtained in each of the examples and the comparative examples was evaluated before a thermal shock test and after the thermal shock test. The thermal shock test was conducted to evaluate durability of the molded product against a sudden temperature change. A high-temperature condition (150° C.) and a low-temperature condition (−40° C.) were alternatingly repeated for every 30 minutes for 1,000 cycles.

The molded component sample before the thermal shock test or after the thermal shock test was set in the jig 40, and was put into water. The compressed air having a pressure of 10.0 kPa was supplied to the jig through a tube for 60 seconds. Then, leakage of the compressed air through the water-proof part was observed. When there was no leakage of the compressed air, a pressure of the compressed air was increased by 10.0 KPa up to 400 kPa. The pressure of the compressed air when leakage was first detected was deemed a sealing pressure. When the sealing pressure was equal to or higher than 50 kPa, the sample passed the test (evaluation as "pass" was given). When the sealing pressure was lower than 50 kPa, the sample failed in the test (evaluation as "fail" was given). The evaluation results are shown in Table 1 and Table 2.

TABLE 1

|  |  | Example 1 | Example 2 | Example 3 | Example 4 | Example 5 | Example 6 | Example 7 | Example 8 |
|---|---|---|---|---|---|---|---|---|---|
| Presence or absence of debris | — | Absent | Absent | Absent | Absent | Absent | Absent | Absent | Absent |
| Groove depth (A) | μm | 60 | 60 | 60 | 80 | 80 | 80 | 80 | 80 |
| Groove depth (A) including debris | μm | — | — | — | — | — | — | — | — |
| Angle (B) | degree | 120 | 135 | 150 | 120 | 135 | 150 | 135 | 135 |
| Groove minimum width (C) | μm | 30 | 28 | 26 | 26 | 24 | 22 | 24 | 24 |
| Groove maximum width (D) | μm | 35 | 35 | 35 | 35 | 35 | 35 | 35 | 35 |
| (C/D) | — | 0.86 | 0.80 | 0.74 | 0.74 | 0.69 | 0.63 | 0.69 | 0.69 |
| Resin type | — | SPS | SPS | SPS | SPS | SPS | SPS | PPS | PA6T |
| Number of grooves | Number | 20 | 20 | 20 | 20 | 20 | 20 | 5 | 12 |
| Evaluation Peel stretch | N/(12.7 mm) | 1.9 | 2.0 | 2.2 | 2.6 | 2.8 | 3.0 | 4.9 | 2.7 |
| Airtightness test before thermal shock test | kPa | 110 | 120 | 130 | Over 200 | Over 200 | Over 200 | 100 | 110 |
|  | Result | Pass | Pass | Pass | Pass | Pass | Pass | Pass | Pass |
| Airtightness test after thermal shock test | kPa | 90 | 100 | 100 | Over 200 | Over 200 | Over 200 | 80 | 70 |
|  | Result | Pass | Pass | Pass | Pass | Pass | Pass | Pass | Pass |

TABLE 2

|  |  | Comparative Example 1 | Comparative Example 2 | Comparative Example 3 | Comparative Example 4 |
|---|---|---|---|---|---|
| Presence or absence of debris | — | Present | Present | Absent | Absent |
| Groove depth (A) | μm | 60 | 80 | 60 | 80 |
| Groove depth (A) including debris | μm | 80 | 100 | — | — |
| Angle (B) | degree | 100 | 100 | 160 | 160 |
| Groove minimum width (C) | μm | 28 | 28 | 20 | 19 |
| Groove maximum width (D) | μm | 35 | 35 | 35 | 35 |
| (C/D) | — | 0.80 | 0.80 | 0.57 | 0.54 |
| Resin type | — | SPS | SPS | SPS | SPS |
| Number of grooves | Number | 20 | 20 | 20 | 20 |
| Evaluation Peel strength | N/(12.7 mm) | 1.7 | 2.6 | 1.6 | 2.4 |
| Airtightness test before thermal shock test | kPa | 100 | Over 200 | 110 | 170 |
|  | Result | Pass | Pass | Pass | Pass |
| Airtightness test after thermal shock test | kPa | 20 | 40 | 10 | 20 |
|  | Result | Fail | Fail | Fail | Fail |

From Table 1, it can be understood that, in each of Examples 1 to 8, peel strength and airtightness were excellent. In contrast, with reference to Table 2, removal of debris was not performed in Comparative Examples 1 and 2. Thus, the samples in Comparative Examples 1 and 2 failed in the airtightness test after the thermal shock test. Further, in Comparative Examples 3 and 4, although removal of debris was performed, the angle (B) exceeded 150 degrees, and the ratio (C/D) of the minimum width (C) of the groove with respect to the maximum width (D) of the groove was less than 0.58. Thus, the samples in Comparative Examples 3 and 4 failed in the airtightness test after the thermal shock test.

Based on those results, it is understood that excellent peel strength and airtightness can be achieved under conditions where debris is removed from the surface of the terminal, the angle formed by the inclination surface near the opening of the groove with respect to the surface of the terminal is between 100 degrees and 150 degrees, and the ratio of the minimum width of the groove with respect to the maximum width of the groove is equal to or greater than 0.58 and less than 1.0.

The present embodiment is described above with Examples. The present embodiment is not limited thereto, and various modifications can be made within the scope of the present embodiment.

What is claimed is:

1. A connector, comprising:
   a terminal; and
   a housing being formed of resin and being configured to house and retain the terminal, wherein
   one or a plurality of grooves extend in a direction vertical to a longitudinal direction of the terminal, each groove being arranged and formed in a part of a region of a surface of the terminal,
   an inclination surface is formed near an opening of the groove, the inclination surface being inclined with respect to the surface,
   the groove is formed to have a part with a minimum width parallel to the surface and a part with a maximum width parallel to the surface in a stated order from the opening in a depth direction vertical to the surface,
   an angle formed by the inclination surface near the opening of the groove with respect to the surface is between 100 degrees and 150 degrees, and a ratio of the minimum width of the groove with respect to the maximum width of the groove is equal to or greater than 0.58 and less than 1.0, and
   the terminal is embedded and fixed in the resin forming the housing in a part including a region where the groove extends.

2. The connector according to claim 1, wherein airtightness between the housing and the terminal, measured under a condition A described below, is equal to or greater than 50 kPa:

(condition A) compressed air is blown between the housing and the terminal from one side of the connector, a pressure of the compressed air is increased from 10.0 kPa to 400.0 kPa in constant intervals every 60 seconds, and a pressure of the compressed air when air leakage is detected at the other side of the connector is deemed to be airtightness pressure.

3. A method of manufacturing the connector according to claim 1, the method comprising:
   forming one or a plurality of grooves in a part of a region of a surface of a terminal through laser irradiation, each groove extending in a direction vertical to a longitudinal direction of the terminal; and
   removing debris from the surface of the terminal through laser irradiation, the debris being generated at the time of forming the groove.

* * * * *